Patented Aug. 11, 1936

2,050,752

UNITED STATES PATENT OFFICE 2,050,752

PRODUCTION OF ACRYLIC ACID CHLORIDE

Hans Fikentscher, Ludwigshafen-on-the-Rhine, Germany, assignor to I. G. Farbenindustrie Aktiengesellschaft, Frankfort-on-the-Main, Germany No Drawing. Application June 24, 1930, Serial No. 463,577. In Germany June 29, 1929

7 Claims. (Cl. 260—123)

The present invention relates to the production of acrylic acid chloride.

I have found that acrylic acid chloride is obtained in a simple manner by contacting while heating β-chloropropionic acid chloride, preferably in the form of vapor, with catalysts splitting off hydrochloric acid from organic compounds containing chlorine, as for example metal chlorides, such as barium chloride or metal oxides such as alumina or bauxite, or sherds of burnt clay or similar highly porous argillaceous materials, at elevated temperatures such as at or above the boiling point of β-chloropropionic acid chloride. The acrylic acid chloride is then recovered by fractional distillation. The unconverted β-chloropropionic acid chloride may be returned afresh to the process so that a practically complete conversion of the initial material employed may be effected. The process may also be carried out in the presence of inert gaseous diluents, such as nitrogen or carbon dioxide, whereby the acrylic acid chloride is quickly removed from the reaction vessel and is prevented from undergoing side reactions. The aforesaid argillaceous materials mainly consist of alumina and may contain silica, iron, magnesium and other elements; they may be employed in any form after baking, but baking should not be carried out at temperatures at which the materials begin to sinter.

The following examples will further illustrate the nature of this invention, but the invention is not restricted to these examples.

Example 1

β-chloropropionic acid chloride is distilled from a vessel through a tube 1 meter in length which is charged with glass beads and dried and powdered barium chloride and which is heated to an internal temperature of from about 280° to 300° centigrade. The vapors which have passed over the barium chloride are condensed in a cooler and yield a mixture of unchanged β-chloropropionic acid chloride and acrylic acid chloride. Hydrochloric acid gas is evolved during the reaction. The distillate is subjected to a fractional distillation and the unchanged β-chloropropionic acid chloride is passed afresh over the heated catalyst.

Example 2

Crude β-chloropropionic acid chloride is heated to about 180° centigrade in a vessel provided with a fractionating column. The fractionating column is charged with a filler and anhydrous barium chloride. Hydrogen chloride is evolved and the distillate passing over between 70° and 74° centigrade is almost pure acrylic acid chloride without another fractional distillation. A small resinified residue remains behind in the vessel. The yield amounts to from about 80 to 85 per cent of the theoretical yield.

Example 3

β-chloropropionic acid chloride is heated to from 140° to 170° centigrade in a vessel provided with a fractionating column filled with clay sherds, a slow current of dry nitrogen being passed through the apparatus. The whole quantity of the liquid distils over at from 70° to 74° centigrade. For the removal of about 15 per cent of the original β-chloropropionic acid chloride which is taken over, the distillate is then subjected to fractional distillation, whereby pure acrylic acid chloride is obtained in a yield of about 84 per cent of the theoretical yield.

Example 4

100 parts of β-chloropropionic acid chloride are distilled at 180° centigrade from a vessel which is charged with 40 parts of clay sherds, through a fractionating column. The acrylic acid chloride together with the hydrochloric acid evolved distils over at about 60° centigrade.

The distillate is freed by rectification from about 15 per cent of β-chloropropionic acid chloride which have passed over therewith.

What I claim is:—

1. The process for the catalytic production of acrylic acid chloride which comprises contacting β-chloropropionic acid chloride while heating with a substance mainly consisting of a dry porous oxidic aluminium compound selected from the group consisting of aluminium hydroxide, burnt clay and alumina.

2. The process for the catalytic production of acrylic acid chloride which comprises contacting vapors of β-chloropropionic acid chloride with a substance mainly consisting of a dry porous oxidic aluminium compound selected from the group consisting of aluminium hydroxide, burnt clay and alumina.

3. The process for the catalytic production of acrylic acid chloride which comprises contacting vapors of β-chloropropionic acid chloride in the presence of an inert gaseous diluent with a substance mainly consisting of a dry porous oxidic aluminium compound selected from the group consisting of aluminium hydroxide, burnt clay and alumina.

4. The process for the catalytic production of acrylic acid chloride which comprises contacting vapors of β-chloro-propionic acid chloride with sherds of burnt clay.

5. The process for the catalytic production of acrylic acid chloride which comprises contacting vapors of β-chloro-propionic acid chloride with dry, porous alumina.

6. The process for the catalytic production of acrylic acid chloride which comprises contacting β-chloropropionic acid chloride while heating to a temperature between about 140° and about 300° C. with a substance mainly consisting of a dry porous oxidic aluminium compound selected from the group consisting of aluminium hydroxide, burnt clay and alumina.

7. The process for the catalytic production of acrylic acid chloride which comprises contacting vapors of β-chloropropionic acid chloride while heating to a temperature between about 140° and about 300° C. with a substance mainly consisting of a dry porous oxidic aluminium compound selected from the group consisting of aluminium hydroxide, burnt clay and alumina.

HANS FIKENTSCHER.